US010652538B2

(12) United States Patent
Pihl et al.

(10) Patent No.: US 10,652,538 B2
(45) Date of Patent: May 12, 2020

(54) VIDEO ENCODING METHOD AND SYSTEM

(71) Applicant: Axis AB, Lund (SE)

(72) Inventors: Fredrik Pihl, Lund (SE); Xing Danielsson Fan, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 16/199,225

(22) Filed: Nov. 26, 2018

(65) Prior Publication Data

US 2019/0191159 A1    Jun. 20, 2019

(30) Foreign Application Priority Data

Dec. 19, 2017 (EP) ..................................... 17208292

(51) Int. Cl.
| | |
|---|---|
| *H04N 19/122* | (2014.01) |
| *H04N 19/154* | (2014.01) |
| *H04N 19/136* | (2014.01) |
| *H04N 19/176* | (2014.01) |
| *H04N 19/137* | (2014.01) |
| *H04N 19/172* | (2014.01) |
| *H04N 19/119* | (2014.01) |
| *H04N 19/174* | (2014.01) |

(52) U.S. Cl.
CPC ......... *H04N 19/122* (2014.11); *H04N 19/119* (2014.11); *H04N 19/136* (2014.11); *H04N 19/137* (2014.11); *H04N 19/154* (2014.11); *H04N 19/172* (2014.11); *H04N 19/176* (2014.11); *H04N 19/174* (2014.11)

(58) Field of Classification Search
CPC .................................................. H04N 19/122
See application file for complete search history.

(56) References Cited

U.S. PATENT DOCUMENTS

| | | | | |
|---|---|---|---|---|
| 6,529,634 | B1 * | 3/2003 | Thyagarajan | H04N 19/60 358/426.01 |
| 6,529,643 | B1 * | 3/2003 | Loce | H04N 1/047 382/300 |
| 9,307,253 | B2 * | 4/2016 | Lundberg | H04N 19/503 |
| 9,936,217 | B2 * | 4/2018 | Chen | H04N 19/172 |
| 10,110,929 | B2 * | 10/2018 | Martins | H04N 19/426 |

(Continued)

FOREIGN PATENT DOCUMENTS

| | | |
|---|---|---|
| EP | 3 021 583 A1 | 5/2016 |
| WO | 2017/123328 A1 | 7/2017 |

OTHER PUBLICATIONS

Shen, L., et al., "An Effective CU Size Decision Method for HEVC Encoders," IEEE Transactions on Multimedia, vol. 15., Issue 2, pp. 465-470 (Feb. 2013).

(Continued)

*Primary Examiner* — Irfan Habib
(74) *Attorney, Agent, or Firm* — Xsensus LLP (57) ABSTRACT

The present invention relates to a system and a method for encoding a video stream. The encoding includes determining a level of relevance for areas in an image frame to be included in the video stream, determining a block size value for coding blocks in the image frame, the block size value is depending on the level of relevance determined for the area including each coding block, respectively, encoding the image frame using coding block sizes based on the determined block size values for each of the coding blocks.

13 Claims, 6 Drawing Sheets

(56) References Cited

U.S. PATENT DOCUMENTS

| | | | |
|---|---|---|---|
| 10,277,901 B2* | 4/2019 | Danielsson Fan ... | H04N 19/137 |
| 10,341,675 B2* | 7/2019 | Pihl ..................... | H04N 19/194 |
| 10,523,955 B2* | 12/2019 | Wang ...................... | G06K 9/66 |
| 2004/0119819 A1* | 6/2004 | Aggarwal .......... | G06K 9/00771 |
| | | | 348/143 |
| 2010/0319030 A1* | 12/2010 | Sakurai ................. | H04N 5/775 |
| | | | 725/45 |
| 2014/0254659 A1 | 9/2014 | Ho et al. | |
| 2017/0201769 A1* | 7/2017 | Chon ................... | H04N 19/593 |
| 2017/0337672 A1* | 11/2017 | Zou .......................... | G06T 7/30 |

OTHER PUBLICATIONS

Wang, Chou-Chen, et al., "An Effective Transform Unit Size Decision Method for High Efficiency Video Coding," Mathematical Problems in Engineering, vol. 2014, Article ID 718189, pp. 1-10 (May 2014).

Partial European Search Report for European Application No. 17208292.7, dated Jun. 7, 2018.

Extended European Search Report for European Application No. 17208292.7, dated Aug. 2, 2018.

* cited by examiner

VIDEO ENCODING METHOD AND SYSTEM

CROSS-REFERENCE TO RELATED APPLICATION

This application claims priority to European Patent Application No. 17208292.7, filed on 19 Dec. 2017, the entire contents of which being incorporated herein by reference.

TECHNICAL FIELD OF THE INVENTION

The present invention relates to a method and a system for encoding video.

BACKGROUND OF THE INVENTION

Video encoding of today is becoming more and more efficient and enables video data to be stored on hard drives and sent over communications networks. In the surveillance industry, a lot of video data is generated every day. The video data in surveillance systems is largely comprised of live video data. This live video data needs to be encoded on the fly, in order to be delivered substantially instantaneously and be relevant for the systems and persons depending on the video for swift and correct decisions. Generally, the video data in a surveillance system needs to be encoded in the device capturing the video, e.g. in a video camera, or in a networked encoder arranged close to the camera, in order to keep the network load low. Hence, the devices performing encoding are often devices having limited processing power and/or storage.

Most schemes developed for encoding video are developed for the motion picture industry, where the encoding is not time critical, and therefore the video can be processed over an extended period of time for high compression and high image reproduction quality. Accordingly, many encoding schemes for encoding motion pictures require multiple pass encoding, i.e. the video is encoded consecutively more than once. Such time-consuming encoding is not viable in a surveillance system. In addition, the multiple pass encoding requires more memory and processing cycles than most surveillance cameras are designed for. Thus, the surveillance video systems require other encoding schemes to lower the network load, storage requirement, and processing requirements.

Many of the widely used and most efficient video encoding schemes used today are block based, i.e. the image processing of each image frame in the video is performed on blocks or units of the image. In video encoding schemes such as Motion JPEG, H.261, MPEG-1 Part 2, H.262/MPEG-2 Part 2, and H.264/MPEG 4 AVC the block structure used includes macro blocks, in JPEG they are called MCUs, which are the basic blocks of these schemes. The macro blocks may then be partitioned into macro block partitions.

Figure 1:
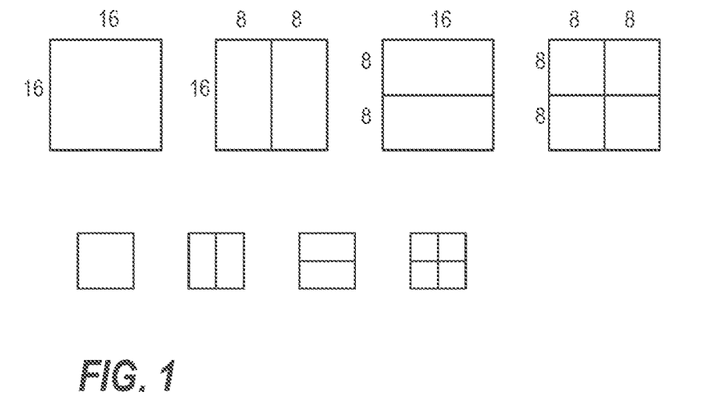
FIG. 1 is depicting various block partitions used in video coding schemes such as H.264.

For H.264 a coded picture consists of a plurality of macro blocks, each containing 16×16 luma samples and associated chrome samples. A macro block may be partitioned in four ways, see FIG. 1. As a 16×16 macro block partition, as two 8×16 macro block partitions, as two 16×8 macro block partitions, or as four 8×8 macro block partitions. The 8×8 partitions may be further partitioned into one 8×8 sub-macroblock partition, two 4×8 sub-macroblock partitions, two 8×4 sub-macroblock partitions, or four 4×4 sub-macroblock partitions. H.264 allows for variable block sizes in a frame. This feature makes it possible to represent video using even less data, since different characteristics of a scene in a video frame are most efficiently coded using different size macroblocks.

In many encoders, a video using even less data is achieved by testing encoding, using all possible combinations of block sizes, within each macroblock, and then comparing the quality between encoding using different block size combinations within each macroblock. If the quality of a macroblock of size 16×16 is only marginally worse than the quality of the smaller sizes, then the macroblock of size 16×16 is selected. However, if there is a relevant difference in quality, an appropriate one of the smaller size macroblocks is selected. The selection of block sizes may be performed using rate distortion (RD) cost calculations for the different sizes.

Figure 2:
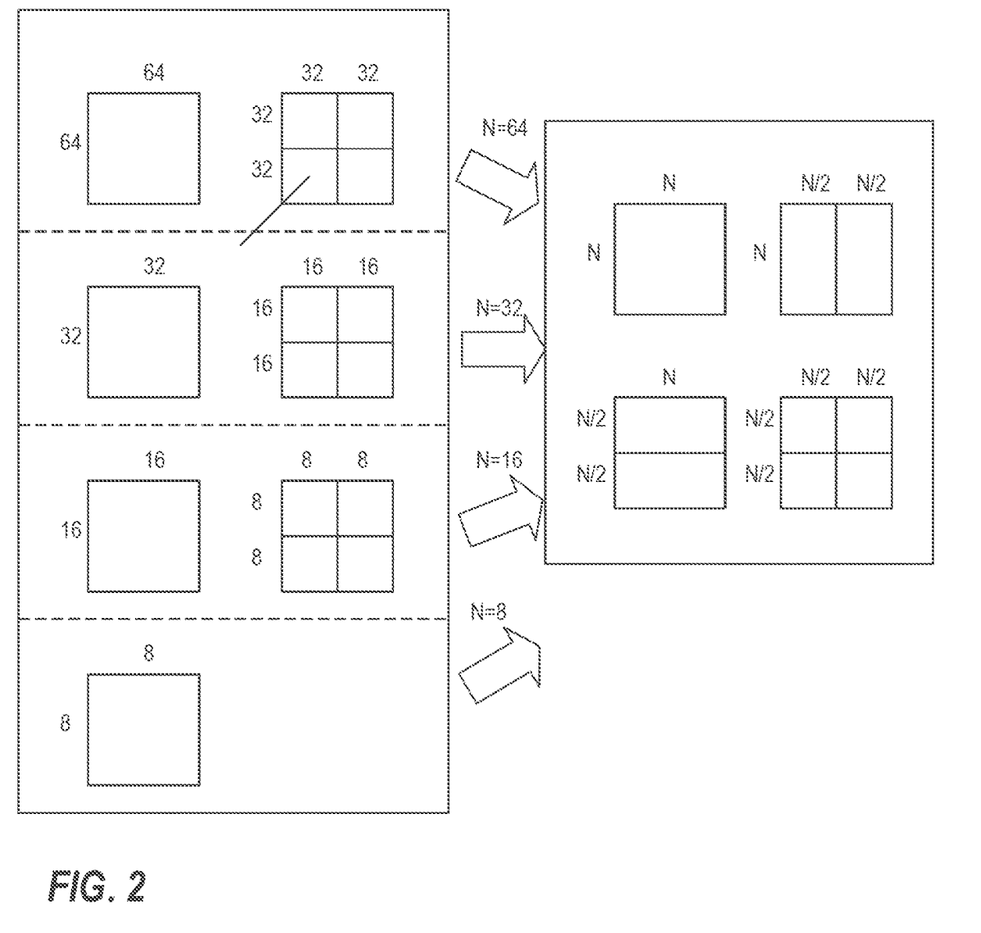
FIG. 2 is depicting various partitions for coding units of H.262/HEVC.

In video encoding schemes such as H.265/HEVC (High Efficiency Video Coding) the block structure includes coding units (CUs), prediction units (PUs), and transform units (TUs). The CU is the basic unit of region splitting and is used for inter prediction and intra prediction. The CU allows for recursive subdividing into four equally sized blocks and may be split by quadtree structure of four level depths. In other words, a CU, having an original size of 64×64 pixels may be subdivided into blocks of sizes 32×32 pixels, 16×16 pixels, and 8×8 pixels, see FIG. 2.

Each CU is then partitioned into one or more PUs, each of which is predicted using intra or inter prediction. A PU is the basic unit for carrying information related to the prediction processes. An inter CU may have four types of PUs, including N×N partition, N×N/2 partition, N/2×N partition and N/2×N/2 partition, wherein the size of the corresponding CU is N×N. An intra CU may have two types of Pus: N×N partition and N/2×N/2 partition. The TUs may be of any one of the partition sizes 32×32 pixels, 16×16 pixels, 8×8 pixels, 4×4 pixels, depending on the size of the corresponding PU.

Figure 3:
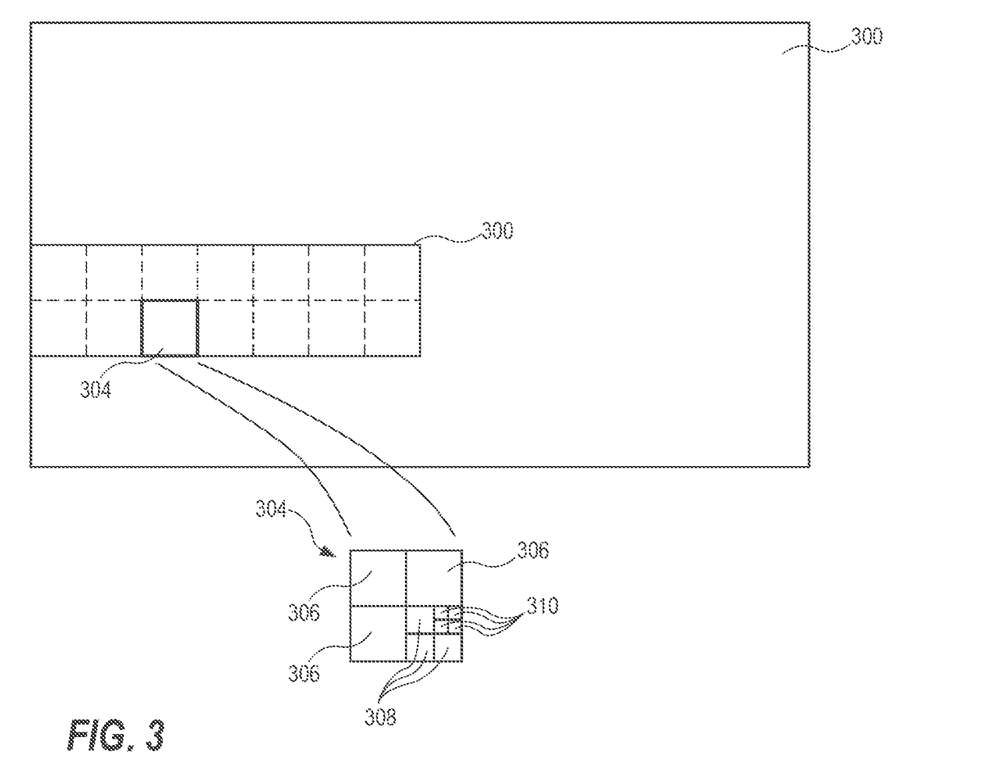
FIG. 3 is depicting a general coding tree structure for block coding schemes in relation to an image frame.

Now referring to FIG. 3, in both H.264 and in HEVC/H.265 a possible structure for a coded image may be as follows. An image frame 300 may be partitioned into slices 302 which in turn may be divided into, in view of H.264, macroblocks 304, or, in view of HEVC/H.265, coding tree units (CTUs) 304. An image frame may include a plurality of slices and each slice includes a plurality of macroblocks 304 or CTUs 304, as indicated by the boxes drawn in dashed lines.

In H.264 each macroblock 304 may then be partitioned, as described above, into macroblock partitions 306 and sub macroblock partitions 308. The partitions 310 in the figure are not relevant for H.264. In HEVC/H.265 each CTU 304 may then be partitioned, as described above, into CUs 306, 308, 310, which in turn may include further partitions in the form of PUs and TUs, not shown.

The selection of macroblock partition sizes or sub-macroblock partition sizes was generally described above, and in H.264 the selection described above, often made through exhaustive testing, i.e. all combinations of sizes are encoded, and for each combination a cost is calculated. Then the most appropriate combination of block sizes within each macroblock is selected based on the calculated cost.

In HEVC/H.265 a cost is calculated, according to a similar concept as is described above, for all possible combinations of CU, PU, and TU sizes, for the purpose of selecting the optimal size combination for the various units. The cost may be a rate distortion (RD) cost, which is a cost function describing the trade-off between quality and bitrate. This exhaustive search for optimal sizes results in high computational complexity and will use a non-acceptable high amount of the processing power and memory capacity of a device that has restricted processing power and memory capacity.

Moreover, in live viewing applications, the time for encoding is also important, in addition to keeping the amount of data used to represent a video low. The video must be encoded and delivered with minimal delay and latency, so that the video may arrive at a receiver within a reasonably time limit. To reduce the computational burden of H.265 encoders, there have been suggested a plethora of encoding methods, arranged to reduce the number of CUs and PUs to be tested. Many approaches include checking all zero block, motion homogeneity, RD cost, or tree pruning, to skip motion estimation on unnecessary CU sizes. Other approaches include early TU decision algorithm (ETDA).

Hereinafter, the term "base coding block" will represent features like macroblocks in H.264, CTUs in HEVC/H.265, and corresponding structures in other coding schemes. Further, the term "coding block" will hereinafter represent features like macroblock partitions and sub-macroblock partitions found in H.264 coding schemes and like CUs, PUs, and TUs HEVC/H.265 coding schemes, and corresponding structures in other coding schemes.

From the above we may conclude that many block based encoding schemes, implementing some kind of coding tree structure, waste a lot of processing power, encoding time, and data storage for achieving encoding with high image quality and using few data bits. The reason for this is, as mentioned above, that most encoding schemes solve the problem of getting as high-quality video as possible, and using as few bits as possible, by encoding all combinations of coding block sizes, for each base coding block in an image frame and then evaluate the cost function, which is based on image quality and data usage.

Such encoding schemes may be used for non-time-critical applications, where the encoding may be performed using powerful computers with access to large data storage areas. However, in applications for capturing live video, using a device having limited computational resources, limited access to power, and limited data storage, these encoding schemes are not applicable. The problem has been recognised for HEVC encoders in the research article "An Effective Transform Unit Size Decision Method for High Efficiency Video Coding" by Chou-Chen Wang, Chi-Wei Tung, and Jing-Wein Wang, published in "Mathematical Problems in Engineering", Volume 2014 (2014), Article ID 718189, http://dx.doi.org/110.1155/2014/718189, from Hindawi Publishing Corporation.

SUMMARY OF THE INVENTION

One object of the present invention is to achieve an improved block based encoding scheme, in particular for live encoding.

The object is achieved by means of a method, according to some embodiments of the invention, for encoding a video stream. The method comprises determining a level of relevance for areas in an image frame to be included in the video stream, determining a block size value for coding blocks in the image frame, wherein the block size value depends on the level of relevance determined for the area including each coding block, respectively, and encoding the image frame using coding block sizes based on the determined block size values for each of the coding blocks.

The advantage of determining a block size value for use in encoding of the image frame before the encoding process, and that the block size value is based on the level of relevance, may be that time is saved as these acts relating to narrowing down the number of encoding iterations for various block sizes may be performed in parallel with image enhancements, reconstruction and other pre-encoding processes. The level of relevance of areas may be determined based on image data that has been subject to no—or at least virtually no—reconstruction or image enhancement. Thereby it is possible to analyse the image data for level of relevance in areas and, thus, the block size values, during a time period when the enhancements, reconstruction and other pre-encoding processes are performed. Further, the time aspect of the inventive scheme becomes more important the higher the requested frame rate for the resulting video is.

The encoding of the image frame using coding block sizes based on the determined block size values may include setting the coding block size to the size corresponding to the determined block size value for each coding block, respectively. By presenting the encoder with the block sizes for the coding blocks no processing relating to determining the sizes of the coding blocks needs to be performed in the encoder, and the system may still utilise the quality and bitrate advantage of video coded using varying block sizes for the coding blocks. Hence, allowing high quality video using less processing power and less time.

In other embodiments, the encoding of the image frame, using coding block sizes based on the determined block size values, may include setting the minimum coding block size, to be allowed for encoding each coding block, to a size corresponding to the determined block size value for each coding block, respectively. The advantage of such embodiments is that the number of iterations of trying various block sizes for the coding blocks is limited and thereby time and processing power is saved.

In yet other embodiments, the encoding of the image frame, using coding block sizes based on the determined block size values, includes determining a group of coding block sizes, among a plurality of predetermined groups of block sizes, based on the determined block size value, wherein the coding block sizes in the determined group for a specific coding block are the only coding block sizes allowed during the encoding of the specific coding block. These embodiments also limit the number of iterations needed for achieving the quality and bitrate advantage of varying sizes for the coding blocks.

The determining of the level of relevance for areas in an image frame to be included in the video stream is performed before the encoding of the image frame is started.

Moreover, the act of determining the level of relevance for areas in an image frame, to be included in the video stream, may include determining a level of motion in areas of the image frame, based on the presently processed image frame and at least one earlier image frame, wherein a higher value for the level of relevance is set for an area presenting more motion, than for an area presenting less motion. An advantage of this is that it becomes possible to vary the sizes of the coding blocks, based on motion detection analysis, that may be performed in the system for other functions as well. Moreover; the areas of motion, which probably are areas of interest, may be allowed smaller size coding blocks, allowing better quality, than an area without any motion.

Further, the determining of the level of relevance for areas in an image frame, to be included in the video stream, includes determining a noise level in areas of the image frame, wherein a lower value for the level of relevance is set where a higher noise level is determined, than for where a lower noise level is determined. An advantage of this is that it becomes possible to vary the sizes of the coding blocks based on noise levels in the image, which may be measured or calculated in the system for other functions as well.

Moreover, the quality of the areas of more noise may be restricted to larger size coding block as there is little gain in applying the image quality related to small size coding blocks to noisy parts of the image, as the enhancement in quality in case of small size coding blocks rather may enhance the noise than the image.

The determining of a noise level in areas of the image frame may be achieved by estimating the noise level based on a noise model calculated for an image sensor capturing the image frame, or the determining of a noise level in areas of the image frame may be achieved by measuring the noise level in the areas of the image frame.

Further yet, the determining of the level of relevance for areas in an image frame, to be included in the video stream, includes determining the level of details in the areas, wherein a higher value for the level of relevance is set if the area is determined to include low levels of detail, than for an area determined to include non-relevant details, and wherein an even higher value for the level of relevance is set if the area includes relevant details. In this way, small size coding blocks may be applied to the areas of relevant detail, and, e.g., an image area depicting a clear blue sky, not including details at all, may be limited to large size coding blocks.

The determining of the level of relevance for areas in an image frame, to be included in the video stream, may comprise: calculating a statistical measure for groups of neighbouring pixels, the statistical measure for each group of neighbouring pixels being referred to as a group value for the specific group of neighbouring pixels, calculating differences between group values, comparing said differences to a predetermined threshold value, if the difference is equal to or above the threshold value, increasing the level of relevance of an area including the group, and if said difference is below said threshold value, decreasing the level of relevance of an area including the group. In this way, the level of relevance may avoid setting a high level of relevance on, e.g., an image area depicting a lawn, which may display a lot of details in every grass straw, but not any relevant details. Hence, the area may be restricted to larger size coding blocks.

The statistical measure may be at least one from the group consisting of a sum, a mean, a median, an interquartile range, a standard deviation, a variance, a skewness and a kurtosis, of pixel data in the group of pixels.

Further, the level of relevance, for all areas of the of the image frame to be included in the video stream, is set to low level of relevance if a signal is received indicating that the camera capturing the image frame is panning or tilting. The advantage of this is that a lot of processing power and time may be saved when processing images to blurry for any high-quality imagery, due to the camera movement during a pan and/or tilt operation. Moreover, the resulting image will be represented by very little data which is advantageous in view of network load for transport of a video stream and/or storage capacity for storage of a video stream.

In alternative embodiments, a system is configured to encode a video stream in accordance with any of the above embodiments. The corresponding advantageous relates to corresponding features of the system.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description. Hence, it is to be understood that this invention is not limited to the particular component parts of the device described or steps of the methods described as such device and method may vary.

It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

Other features and advantages of the present invention will become apparent from the following detailed description of a presently preferred embodiment, with reference to the accompanying drawings, in which.

Further, in the figures like reference characters designate like or corresponding parts throughout the several figures.

DETAILED DESCRIPTION OF EMBODIMENTS

Figure 4:
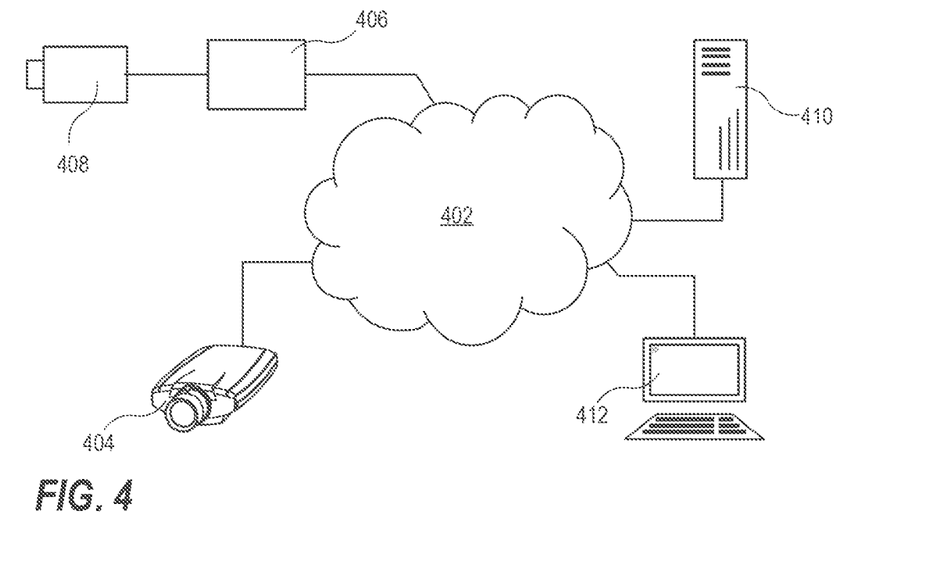
FIG. 4 is a block diagram of a system and an environment where the invention may be implemented, FIG. 5. is a flowchart over a method for encoding a video stream in accordance with embodiments of the invention.

The present invention relates to a method for encoding a video stream and to devices encoding a video stream. FIG. 4 shows an environment where an embodiment of the method for encoding a video stream may be used, and where embodiments of devices that are enabled to encode according to the invention may be arranged. This environment may include a data network 402 for transmission of video streams, a digital network camera 404 connected to the network 402, a networked digital video encoding device 406 connected to an analogue video generator 408, e.g. an analogue video camera 408, a video server 410 for storing encoded video received via the network 402, and a client 412 for accessing and/or displaying encoded video streams via the network 402.

The devices in FIG. 4 are typical devices in an environment of the invention. However, a network 402, connecting one or more devices enabled to encode a video stream in accordance with the invention, may connect to any number of the devices mentioned above. Moreover, the network 402 may also connect to any combinations thereof, e.g. a network may connect to only digital network cameras 404 and a video server 410.

Figure 5:
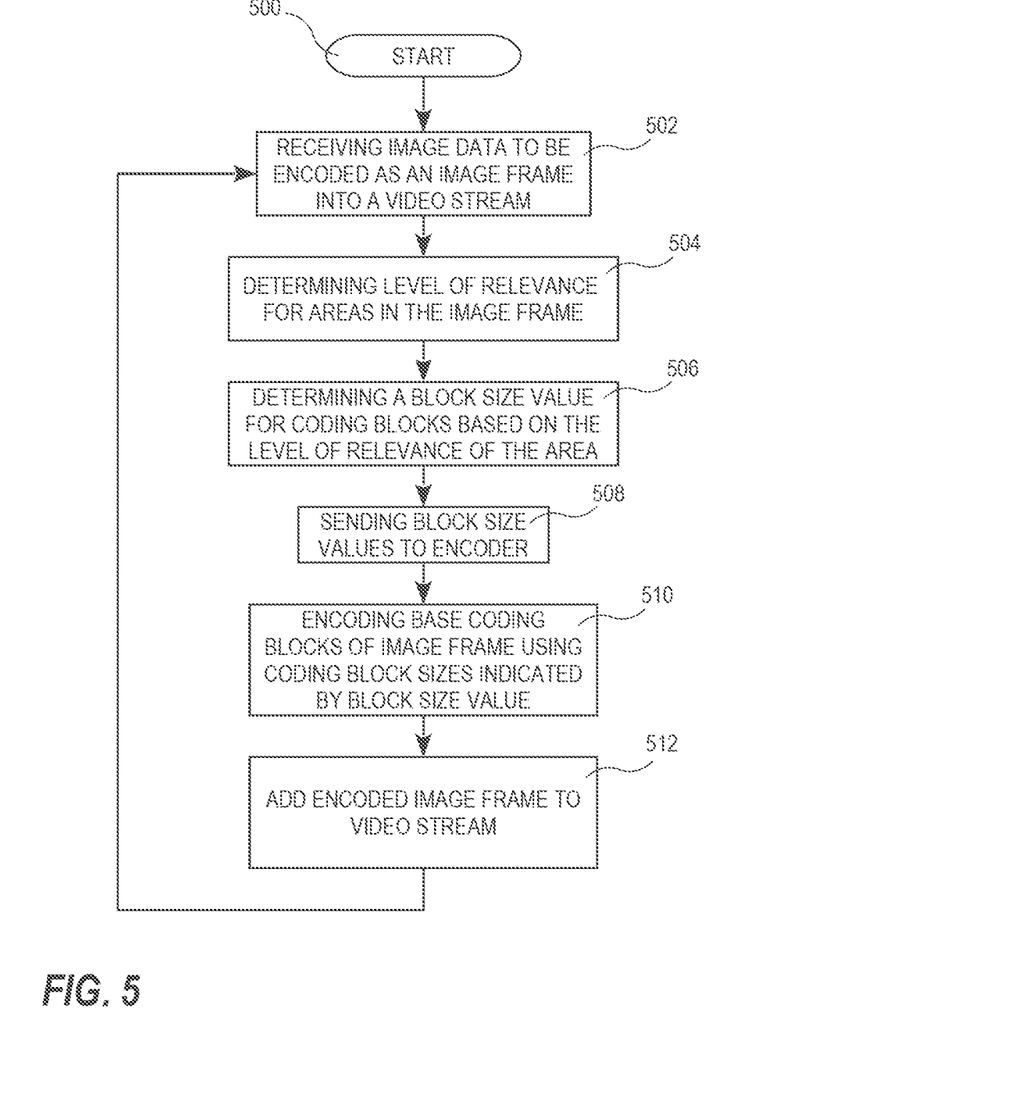

Now referring to FIG. 5, according to some embodiments of the invention, a method 500 for encoding digital images includes the act of receiving image data that is to be encoded as an image frame in a video stream, step 502. The image data received may be data received directly from the image sensor, or it may be data that has been partially processed, e.g. the data may have passed through a Bayer-filter, a colour correction module, etc.

The image data is then analysed for determining a level of relevance of areas within the image frame, step 504. The analysis may be implemented to recognise various features in the frame and in some cases in changes from earlier frames ending in the presently processed frame. Further, the analysis may be based on multiple types of features or on a single feature. In some cases, the entire frame may be found to be one area having the same level of relevance. However, it is more likely that different areas over the image frame are found to have different levels of relevance. Depending on the type of features the level of relevance is based on, the areas may be determined on a pixel level, a base coding block level, a slice level, etc.

From the level of relevance of the one or multiplicity of areas in the image frame, a block size value for coding blocks of the image frame is then determined, step 506. The block size values may be determined for entire base coding blocks, or for parts of a base coding block. Further, each block size value may specify the exact size of the corresponding coding block, e.g. the coding block at a particular position should have the specified size.

Alternatively, each block size value may specify the smallest coding block size that should be allowed in an area, or in a base coding block. In yet another alternative, each block size value specifies a range of coding block sizes that are allowed for an area or a base coding block, i.e. a subset of all possible block sizes for the presently used coding scheme. Then the encoder may stop iteration when that size is reached in the encoding of that area, if it has not stopped already. The information pertaining to the sizes of the coding blocks of the image frame is then sent to the encoder, separate from the image data, step 508.

In some embodiments, information pertaining to the partitioning of the base coding blocks is stored in a memory area. An address to the start of the memory area is stored in a register, which is read by the encoder. The encoder may then read the memory area for instructions on how to partition the base coding blocks. The instruction may be represented by a value that may indicate the allowed size or allowed range of sizes for each individual coding block. For example, the memory area may be arranged as a map over the base coding blocks, wherein each position in the memory area, representing a base coding block, includes the value indicating the allowed partition or the allowed range of partitions for each base coding block.

Then the image frame is encoded using coding blocks of the sizes indicated by the block size values sent to the encoder, step 510. Accordingly, if the block size value specifies the exact size of the coding block, the encoder simply encodes the coding block using this specified size. In this way, the amount of processing power and time used will be decreased substantially, and in particular the processing power used by the encoder, as the decision of the coding block size is performed external to the encoding process.

However, if the block size value specifies the smallest allowed coding block size, the encoder will perform the normal coding block size selection scheme, but will be limited to not go past the specified coding block size. In this way, the amount of processing power and time used will also be decreased substantially, and the processing power required by the encoder will be decreased, as the encoder is limited regarding the number of allowed coding block sizes to try, and the decision of the coding block size limitations is performed external to the encoding process.

In the third alternative, wherein a range of coding block sizes are specified by the block size value, the encoder will perform the normal coding block size selection scheme, but will limit the search for an optimal coding block size to the coding block sizes specified in the block size value for the presently processed image area, base coding block, or coding block. By implementing this later restriction to the encoder, the amount of processing power and time used will also be decreased substantially, and, in particular, the processing power used by the encoder, as the encoder will be limited in regard to the number of allowed coding block sizes to try, and the decision of the coding block size limitations is performed external to the encoding process.

The encoded image frame is then added to the presently generated video stream, step 512. The adding of the encoded image frame may be performed in any way implemented by the encoder. Then the process returns to step 510 and processes the next frame.

The determining level of relevance for areas, step 504, and the block size value determining, step 506, are performed external to an encoding process, depicted in the flowchart by the steps of encoding base coding blocks 50 and adding the encoded image frame to a video stream, and, thus, the steps of determining the level of relevance for areas, step 504, and the block size value determining, step 506, for a new set of image data may be started before the previous set of image data has been encoded.

Figure 6:
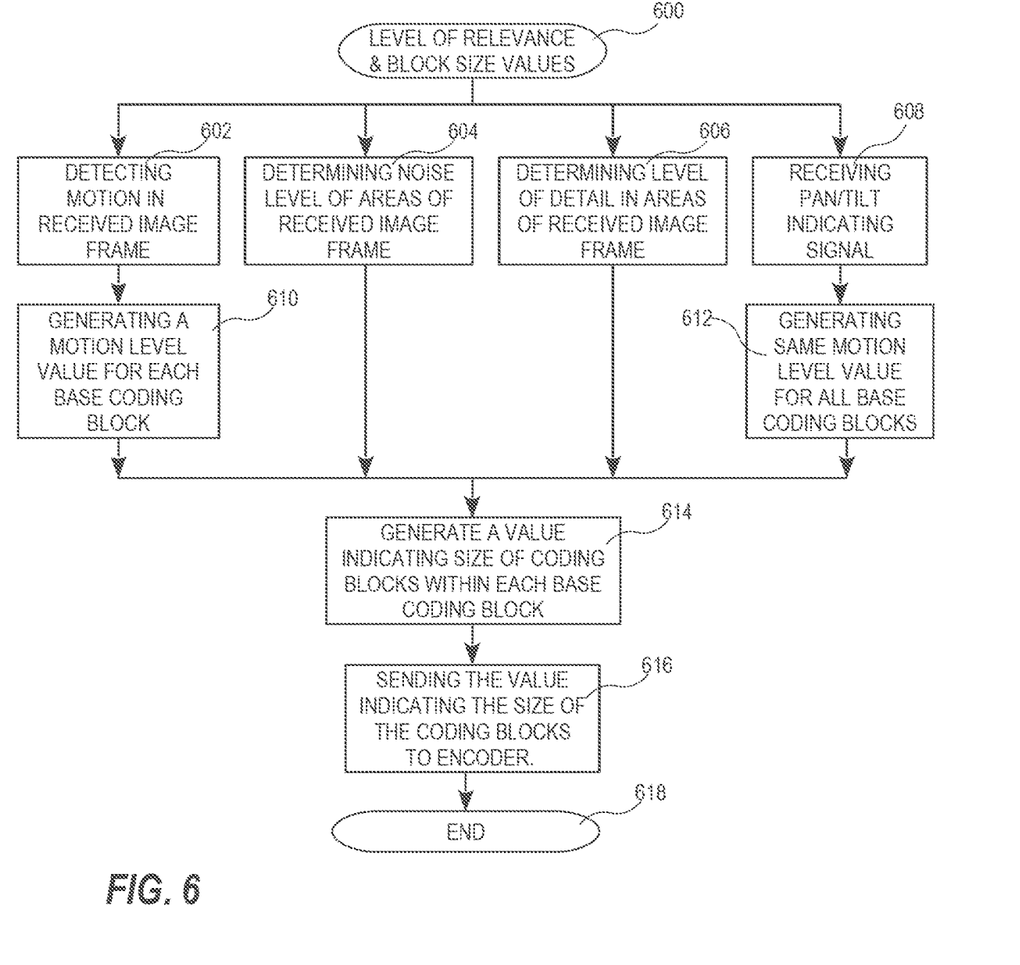
FIG. 6 is a flowchart for level of relevance detection in a method according to embodiments of the invention.

The process for determining level of relevance for areas, step 504, and the block size value determining, step 506, of FIG. 5 is described in more detail in FIG. 6. Generally, the level of relevance of areas in the image scene may be identified by means of analysis of the image data captured of the scene, and/or by means of inputs from sources external to the image data path. The analysis of the image data captured is arranged to identify a feature or features contributing to a level of relevance of different areas of the image scene represented by the image data.

The processes that may be implemented to derive, from the image data, the features that are used to determine various level of relevance of different areas of the image frame, may be any one of, or any combination of, the non-exhaustive group comprising detecting motion in the image frame, step 602, determining noise level in areas of the image frame, step 604, and determining level of relevant details in areas of received image frame, step 606. Another process that may generate a level of interest, is a process of receiving pan/tilt indicating signals, from pan and/or tilt motors controlling a pan/tilt camera, or from a pan and/or tilt angle sensor, all in order to enable detection of the movement of a camera head in a pan/tilt camera, step 608.

Detecting motion in a received image frame, step 602, may be performed using any known motion detection algorithm applied on captured image data. Most motion detection algorithms need data relating to previous images, as well as the presently processed image. The motion detection algorithm generates a position and an area, within the image frame, representing the movement position and movement area, where movement is detected. It will also generate a value indicating the amount of movement detected in the area. The motion detection algorithm may be arranged to detect simultaneous movements in separate parts of the image frame. A motion level value is then generated for each base coding block in the image frame, step 610.

Determining noise level of areas of the received image frame, step 604, may include determining the level of light in the scene or measuring the noise in the captured image frame. In the case of determining the level of light in the scene, such process would include reading pixel values in the captured image frame. The pixels read may be substantially all pixels of the image frame, a subset including the image carrying pixels, a subset including the pixels of one or two colour channels, etc. A pixel value indicates the amount of light that has impinged upon the corresponding area of an image sensor that has captured the image. Hence, the higher value, the more light was present in the scene. These pixel values may be added to a total value, or a mean or median value may be generated.

When the process has a value indicating the amount of light in the scene, the light value may be applied in a noise model specially adapted for the sensor that captured the image, and thereby the process may arrive at estimates of noise level values of different areas of the image frame. The alternative of measuring the noise level of different areas may be achieved using known noise measuring methods. The noise level derived is formed into a noise level value for further processing.

Determining level of relevant detail in areas of the received image frame, step 606, may be achieved by processing image data representing pixels of the received image frame. The processing includes calculating a spatial statistical measure of said image data for groups of neighboring pixels in the image frame, to form a group value for each group of pixels. Moreover, differences between group values are calculated, and the differences are compared to a predetermined threshold value. If said difference is equal to, or above said threshold value, the process includes identifying the group as an area having a level of relevant detail, and, if said difference is below said threshold value, the process includes identifying the group as being in an area not having a level of relevant detail.

The spatial statistical measure may be at least one chosen from the group consisting of a sum, a mean, a median, an interquartile range, a standard deviation, a variance, a skewness and a kurtosis of said image data. Hence a level of relevant detail may be determined as a digital value, i.e. relevant or non-relevant. However, the process may test the difference value against additional thresholds and may in that way have an increased resolution of the level of relevant detail by increasing the number of discrete values the difference value may be tested against. Thereby a value for the level of detail in each area may be determined. The comparison of group values may be performed using any edge detector filter, such as Laplace, Sobel, Canny, Laplace of Gaussian, or Difference of Gaussian. A more detailed description of a method for determining the level of relevant detail is presented in the registered U.S. Pat. No. 9,805,287, which hereby is incorporated by reference.

From the pan/tilt indicating signal, received in step 608, a motion level value for all base coding blocks of the image frame is generated, step 612. Because the pan/tilt indicating signal indicates that the camera is moving and thereby the entire scene is moving over the image sensor, the motion level value may be set to the same value over the entire image frame. The motion level value may vary depending on the speed of the motion. Accordingly, a higher motion level value is set for higher pan/tilt speeds and a lower motion level value is set for lower pan/tilt speeds.

Then, a value indicating size of coding block within each base block is generated from one of, or a combination of, the motion level value from steps 610 and 612, the noise level value from step 604, and the value for the level of detail from step 606. The value indicating size of the coding blocks will then be written into a memory area read by the encoder for controlling the coding block size determination in the encoder, step 616. The value may indicate the allowed size or the allowed range of sizes for each individual coding block. Then the process of FIG. 6 ends at step 618. However, the encoding process of FIG. 5 takes over and continues at step 510

Figure 7:
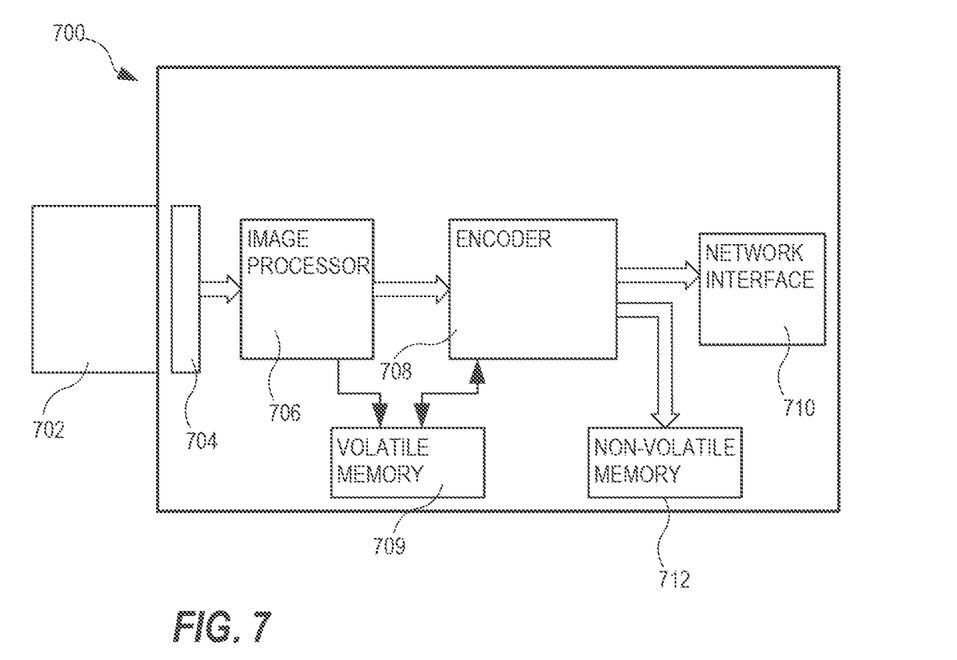
FIG. 7 is a block diagram of a camera including means for implementing embodiments of the invention.

The above described process may be implemented in a camera, see FIG. 7, or in a video encoding device converting analogue video to digital video, not shown. Now referring to FIG. 7, a camera 700 implementing the invention includes a lens 702 for guiding light from the scene to capture onto an image sensor 704. The image sensor may be any type of image sensor, e.g. an image sensor for visible light such as a CMOS image sensor or a COD image sensor, or an image sensor for capturing infrared light. The image sensor is connected to an image processor 706, and image data captured by the image sensor 704 is transferred to the image processor. Each transfer of image data from the image sensor 704 to the image processor is referred to as an image frame, and includes the unprocessed data from the image sensor. The image data may have been amplified and converted to digital from analogue values before transmission. The image processor 706 is arranged to process the image data for enhancement of visual aspects of the image in each frame and to process the image data in accordance with the invention. The image processor will be explained in further detail in FIG. 9.

The image processor 706 is then connected to an encoder 708 operating in accordance with an image encoding scheme, e.g. H.264, HEVC/H.265, etc. The image processor transfers the enhanced image data and coding block size data to the encoder via a memory 709, as described earlier. The memory may be a volatile memory 709, e.g. various RAMs. The camera may further include one or both of a network interface 710 and a non-volatile memory 712. The network interface is arranged to connect to the network 402 for transferring encoded video imagery to a server 410 or a client 412. The non-volatile memory 712 may be arranged to store encoded video imagery internally for later access by a client 412 or a server 410.

Figure 8:
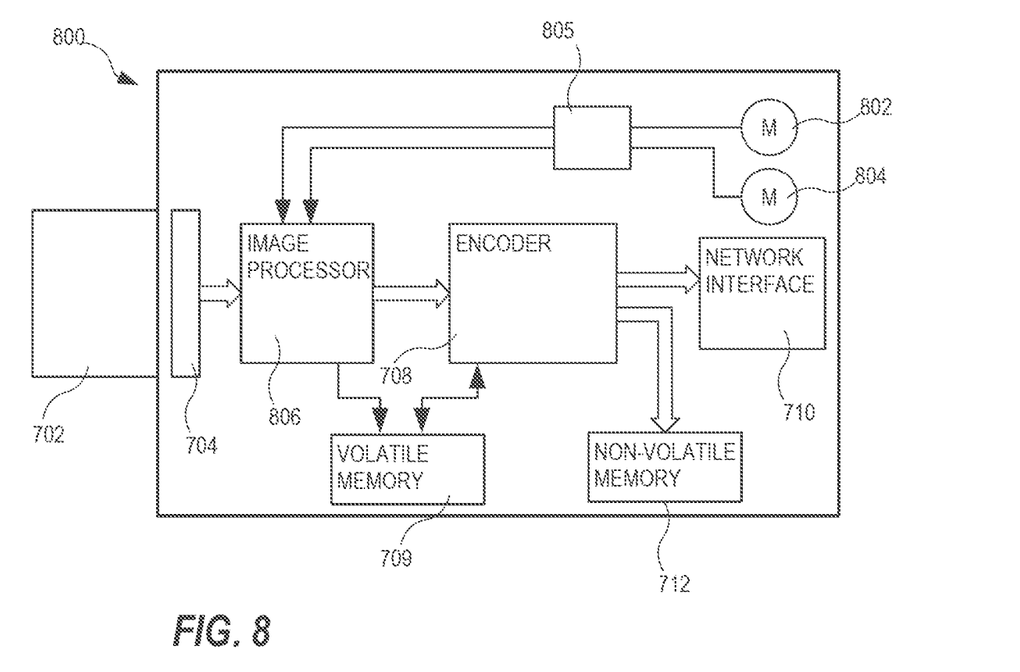
FIG. 8 is a block diagram of a camera having pan/tilt capabilities and including means for implementing embodiments of the invention.

In FIG. 8 another embodiment of a camera 800 implementing the invention is illustrated. This camera 800 is a pan/tilt camera including a panning motor 802 for driving the panning of a camera head and a tilting motor 804 for driving the tilting of the camera head. Signaling lines from the panning motor 802 and from the tilting motor 804 are connected to a motion level value signal generator 805. The motion level signal generator is then connected to an image processor 806. The image capturing operation may be exactly the same as for the camera described in FIG. 7. Hence, the lens 702, the image sensor 704, the encoder 708, the network interface 710, and the non-volatile memory may be the same, or very similar, devices as the ones described in connection with FIG. 7. The image processor 806 differs from the image processor 706 from FIG. 7 in that it is arranged to receive signals from the panning motor 802 and the tilting motor 804. These signals are converted to a motion level value signal in the motion level value signal generator 805, and to base coding block size determinations.

The signals indicate movement of the camera head, and thereby movement of the image view.

Video encoding devices according to embodiments of the invention may include the features described in connection With FIGS. 7 and 8, with the exception of a lens 702, an image sensor 704, and pan/tilt motors 802, 804. Instead, the video encoding device includes a video interface, arranged to connect to an analogue video source, and convert the analogue signal to a digital signal, that may be processed in the image processor. Even if no pan/tilt motors 802, 804, are present in a video encoding device, an I/O-port receiving signals from pan/tilt motors arranged at an analogue pan/tilt camera may be received and processed as described above.

Figure 9:
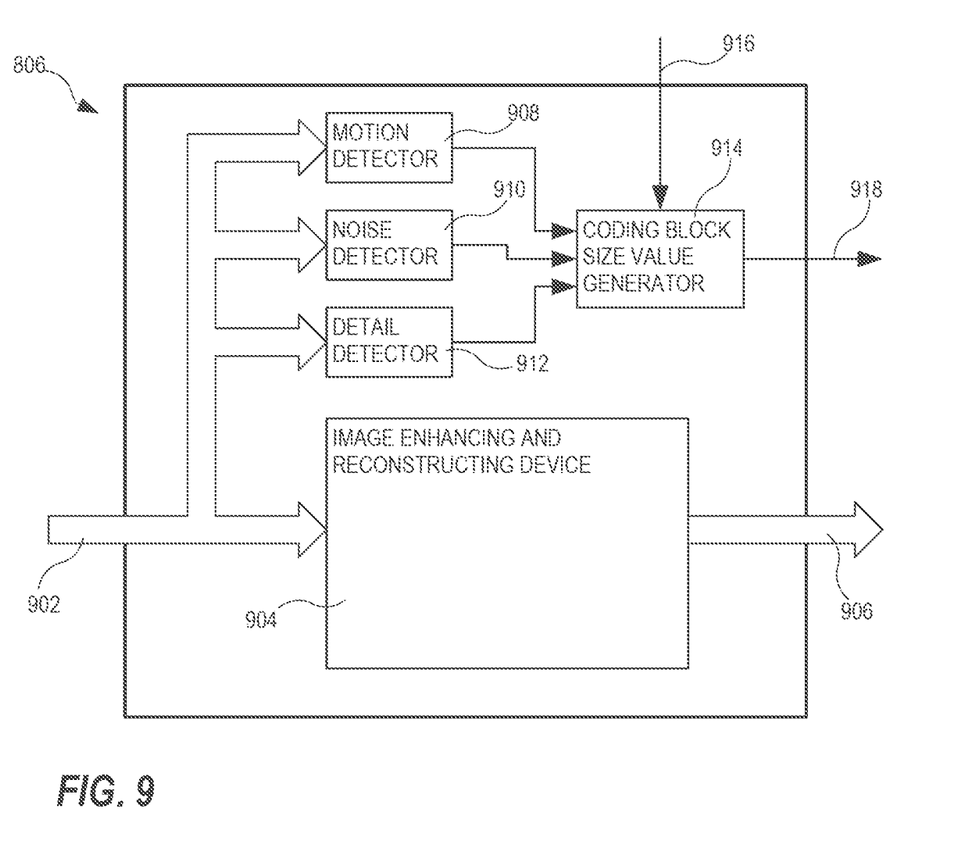
FIG. 9 is a block diagram of an image processor presented in FIG. 7 and in FIG. 8.

FIG. 9 shows a more detailed image of the image processor 806, mentioned in connection with FIG. 8. The image data is received via the data link or data bus 902. The image data is enhanced and reconstructed in the image enhancing and reconstructing device 904, in which the image data may be put through a demosaicing filter, e.g. a Bayer filter, a noise filter, a sharpening filter, etc. Moreover, in the image enhancing and reconstruction devise 904, the white balance of the image data may be adjusted, artefacts in the image data may be removed, gamma correction may be performed on the image data, etc. Then the enhanced and reconstructed image data 906 is forwarded to the encoder 712, for encoding and insertion into a video stream.

The image data on the data bus 902 is also connected to analyzing devices such as a motion detector 908, a noise detector 910, and a detail detector 912, all analyzing image data and generating signals that are used in a coding block size value generator 914. The function of the motion detector 908, the noise detector 910, and the detail detector 912 have been described previously in connection with FIG. 6. Moreover, the coding block size value generator 914 receives a signal 916 from the motion level value signal generator 805 that is connected to the pan/tilt motors, see FIG. 8. The coding block size generator 914 is arranged to generate size values for the coding blocks of the image data, related to the analyzed image data, and therefore the output of the coding block size generator 914 is connected to the encoder 708 via signal line 918.

The image processor 706 of the camera 700 may be identical to the image processor 806 described in detail above, with the difference that there is no signal line 916 conveying motion level values relating to pan/tilt motors. The detailed image processor 706, 806, as described in relation to the cameras of FIGS. 7 and 8, may also be implemented in corresponding video encoding devices. Moreover, an image processor 706, 806, does not necessarily implement all of the motion detector 908, the noise detector 910, and the detail detector 912, but may implement a single one of these or any combination of them.

Any process of encoding a video stream according to an embodiment of the invention may be implemented partly or in its entirety using software code instructions which then may be executed in the device implementing the process. These processes may in some embodiments, thus, be partly implemented using logic circuitry. Alternatively, the entire process may be implemented in logic circuitry. In embodiments of software code instructions being executed in the device there is arranged a memory for storing software code and a processing unit for executing them.

The invention claimed is:

1. Method for encoding a video stream comprising:
   determining a level of relevance for areas in an image frame to be included in the video stream,
   determining a block size value for coding blocks in the image frame, the block size value is depending on the level of relevance determined for the area including each coding block, respectively, wherein higher level of relevance relates to smaller block sizes than lower level of relevance,
   encoding the image frame using coding block sizes based on the determined block size values for each of the coding blocks, wherein
   determining the level of relevance for areas in an image frame to be included in the video stream comprises:
   calculating a statistical measure for groups of neighbouring pixels, the statistical measure for each group of neighbouring pixels being referred to as a group value for the specific group of neighbouring pixels,
   calculating differences between group values,
   comparing said differences to a predetermined threshold value,
   if the difference is equal to or above the threshold value, increasing the level of relevance of an area including the group, and
   if said differences is below said threshold value, decreasing the level of relevance of an area including the group.

2. Method according to claim 1, wherein encoding the image frame using coding block sizes based on the determined block size values includes setting the coding block size to the size corresponding to the determined block size value for each coding block, respectively.

3. Method according to claim 1, wherein encoding the image frame using coding block sizes based on the determined block size values includes setting the minimum coding block size to be allowed for encoding each coding block to a size corresponding to the determined block size value for each coding block, respectively.

4. Method according to claim 1, wherein encoding the image frame using coding block sizes based on the determined block size values includes determining a group of coding block sizes, among a plurality of predetermined groups of block sizes, based on the determined block size value, wherein the coding block sizes in the determined group for a specific coding block are the only coding block sizes allowed during the encoding of the specific coding block.

5. Method according to claim 1, wherein the determining of the level of relevance for areas in an image frame to be included in the video stream is performed before the encoding of the image frame is started.

6. Method according to claim 1, wherein determining the level of relevance for areas in an image frame to be included in the video stream includes determining a level of motion in areas of the image frame based on the presently processed image frame and at least one earlier image frame, wherein a higher value for the level of relevance is set for an area presenting more motion than for an area presenting less motion.

7. Method according to claim 1, wherein determining the level of relevance for areas in an image frame to be included in the video stream includes determining a noise level in areas of the image frame, wherein a lower value for the level of relevance is set where a higher noise level is determined than for where a lower noise level is determined.

8. Method according to claim 7, wherein the determining of a noise level in areas of the image frame is achieved by estimating the noise level based on a noise model calculated for an image sensor capturing the image frame.

9. Method according to claim 7, wherein the determining of a noise level in areas of the image frame is achieved by measuring the noise level in the areas of the image frame.

10. Method according to claim 1, wherein determining the level of relevance for areas in an image frame to be included in the video stream includes determining the level of details in the areas, wherein a higher value for the level of relevance is set if the area is determined to include low levels of detail than for an area determined to include non-relevant details, and wherein an even higher value for the level of relevance is set if the area includes relevant details.

11. A Method for encoding a video stream comprising:
determining a level of relevance for areas in an image frame to be included in the video stream,
determining a block size value for coding blocks in the image frame, the block size value is depending on the level of relevance determined for the area including each coding block, respectively, wherein higher level of relevance relates to smaller block sizes than lower level of relevance,
encoding the image frame using coding block sizes based on the determined block size values for each of the coding blocks wherein determining the level of relevance for areas in an image frame to be included in the video stream comprises: calculating a statistical measure for groups of neighboring pixels, the statistical measure for each group of neighboring pixels being referred to as a group value for the specific group of neighboring pixels, calculating differences between group values, comparing said differences to a predetermined threshold value, if the difference is equal to or above the threshold value, increasing the level of relevance of an area including the group, and if said differences is below said threshold value, decreasing the level of relevance of an area including the group, wherein the statistical measure is at least one from the group consisting of a sum, a mean, a median, an interquartile range, a standard deviation, a variance, a skewness and a kurtosis, of pixel data in the group of pixels.

12. Method according to claim 1, wherein the level of relevance for all areas of the of the image frame to be included in the video stream is set to low level of relevance if a signal indicating that the camera capturing the image frame is panning or tilting.

13. A system configured to encode a video stream in accordance with the method of claim 1.

* * * * *